(12) United States Patent
Hensley

(10) Patent No.: US 10,759,401 B1
(45) Date of Patent: Sep. 1, 2020

(54) TOWED VEHICLE BRAKE CONTROLLER

(71) Applicant: James C. Hensley, Centralia, IL (US)

(72) Inventor: James C. Hensley, Centralia, IL (US)

(73) Assignee: James C. Hensley Revocable Living Trust A, Centralia, IL (US)

( * ) Notice: Subject to any disclaimer, the term of this patent is extended or adjusted under 35 U.S.C. 154(b) by 232 days.

(21) Appl. No.: 15/875,600

(22) Filed: Jan. 19, 2018

Related U.S. Application Data

(60) Provisional application No. 62/449,233, filed on Jan. 23, 2017.

(51) Int. Cl.
| B60T 8/172 | (2006.01) |
| B60T 7/04 | (2006.01) |
| B60T 8/17 | (2006.01) |

(52) U.S. Cl.
CPC .............. B60T 8/172 (2013.01); B60T 7/042 (2013.01); B60T 8/1701 (2013.01)

(58) Field of Classification Search
CPC ................................. B60T 7/045; B60T 7/128
See application file for complete search history.

(56) References Cited

U.S. PATENT DOCUMENTS

| 4,076,327 | A | 2/1978 | Hubbard |
| 6,012,780 | A | 1/2000 | Duvernay |
| 6,050,649 | A * | 4/2000 | Hensley ................. B60Q 1/441 188/158 |
| 6,068,352 | A | 5/2000 | Kulkarni et al. |
| 6,126,246 | A | 10/2000 | Decker, Sr. et al. |
| 6,179,390 | B1 | 1/2001 | Guzorek et al. |
| 6,364,432 | B1 | 4/2002 | Mixon |
| 6,445,993 | B1 | 9/2002 | Eccleston et al. |
| 6,615,125 | B2 | 9/2003 | Eccleston et al. |
| 6,652,038 | B1 | 11/2003 | Frye |
| 6,802,572 | B2 | 10/2004 | Lamke |
| 6,837,551 | B2 | 1/2005 | Robinson et al. |
| 6,845,851 | B1 | 1/2005 | Donaldson et al. |
| 6,874,602 | B2 | 4/2005 | Greaves, Jr. |
| 7,058,499 | B2 | 6/2006 | Kissel |
| 7,204,564 | B2 | 4/2007 | Brown et al. |
| 7,311,364 | B2 | 12/2007 | Robertson |
| 7,347,507 | B1 | 3/2008 | Stillinger |
| 8,180,546 | B2 | 5/2012 | Culbert et al. |
| 8,430,458 | B2 | 4/2013 | Kaminski et al. |
| 8,463,519 | B2 | 6/2013 | McCann |
| 8,651,585 | B2 | 2/2014 | Kaminski et al. |
| 9,315,173 | B1 | 4/2016 | Gray et al. |
| 9,346,439 | B2 | 5/2016 | Diehl et al. |
| 9,446,747 | B2 | 9/2016 | Fosdike |
| 9,707,950 | B2 * | 7/2017 | Wessner ................... G01L 5/28 |

(Continued)

*Primary Examiner* — Anne Marie Antonucci
*Assistant Examiner* — Abdalla A Khaled
(74) *Attorney, Agent, or Firm* — Sandberg Phoenix & von Gontard, P.C.

(57) ABSTRACT

A brake controller for controlling the brakes of a towed vehicle which is pulled by a towing vehicle comprises a sensor assembly which determines the position of the brake pedal of the towing vehicle, and if necessary, compensates for inertia which can affect the output of some sensors. The output of the sensor assembly is transmitted to a processor, which in turn transmits a signal (the strength of which is a function of the pedal position) to brakes of the towed vehicle to activate the brakes of the towed vehicle.

4 Claims, 4 Drawing Sheets

(56) References Cited

U.S. PATENT DOCUMENTS

| | | |
|---|---|---|
| 9,758,138 B2 * | 9/2017 | Albright ................ B60T 7/20 |
| 2002/0123837 A1 | 9/2002 | Eccleston et al. |
| 2003/0168908 A1 | 9/2003 | Robinson et al. |
| 2005/0127747 A1 | 6/2005 | Robertson |
| 2008/0115995 A1 * | 5/2008 | Holland ............... B60T 8/3225 180/216 |
| 2008/0296968 A1 | 12/2008 | Culbert |
| 2010/0152920 A1 | 6/2010 | McCann |
| 2014/0200786 A1 * | 7/2014 | Morselli ............ B60T 8/1708 701/74 |
| 2015/0081184 A1 | 3/2015 | Braunberger |

* cited by examiner

TOWED VEHICLE BRAKE CONTROLLER

CROSS-REFERENCE TO RELATED APPLICATIONS

This application claims priority to U.S. App. No. 62/449,233 filed Jan. 23, 2017, entitled "Towed Vehicle Brake Controller," and which is incorporated herein by reference.

STATEMENT REGARDING FEDERALLY SPONSORED RESEARCH OR DEVELOPMENT

Not Applicable.

BACKGROUND

This invention relates generally to towed vehicle brake controllers and, in particular, to a novel towed vehicle brake controller which can be retrofitted to a towing vehicle to effect a gradual application of the towed vehicle brakes proportional to the movement of the towing vehicle brake pedal.

Towed vehicles, such as recreational and utility trailers adapted to be towed by automobiles and small trucks, are commonly provided with electric brakes. The electric brakes generally include a pair of brake shoes located at each wheel which, when actuated, frictionally engage a brake drum on the towed vehicle. An electromagnet is mounted on one end of a lever to actuate the brake shoes, and is drawn against the rotating brake drum when an electrical current is applied, thereby pivoting a lever to actuate the brake shoes. Typically, the braking force provided is proportional to the electrical current applied to the electromagnet. The electrical current may run as high as 12 amperes on a double axle trailer.

Early trailer brake controllers for towed vehicles tied directly into the towing vehicles' braking system, either by tapping into the brake lines of the towing vehicle to determine the brake pressure or determining the position of the brake pedal with different types of linkages to determine the pedal position and to then apply the brakes of the towed vehicle accordingly. Some controls used a timer tied to the towing vehicle's brake lights that would gradually apply trailer brakes over a period of seconds.

Current commercially available controllers (apart from some integrated vehicle controllers) generally are either timer based controllers or velocity sensor based controllers.

In timer based controllers, the towed vehicle brakes are engaged a set time period after the towing vehicle brakes are engaged. The time period is set by the driver and is often adjustable. These controllers are typically tied into the brake light system, to be activated when the brake lights are activated. In timer based control systems, braking increases at a preset rate until the brakes are released or maximum braking is reached. Such systems are of simple design, are inexpensive, and are easy to mount. However, because they are time based, the braking of the towed vehicle is not proportional to the braking of the towing vehicle. Further, they must be connected to the brake indicator system.

In a velocity sensor based controller, the towed vehicle's brakes are applied in a proportional manner according to changes in velocity of the towing vehicle. Velocity changes are sensed either by pendulum based sensors or accelerometer chips. True velocities are not detected, only changes in "g-forces" are detected. Unlike the timer based systems, velocity sensor based systems provide for a form of proportional braking when deceleration is detected. These velocity sensor based systems are responsive to changes in speed, rather than braking activity, and can thus be fooled by road conditions and/or vehicle orientation. Also, like the timer based systems, the velocity sensor based systems require connectivity to the towing vehicle's brake indicator system.

Current towed vehicle brake controllers suffer from the flaw that they try to infer braking activity, rather than measuring braking activity. Therefore, typical timer-based systems or velocity sensor based systems apply the brakes of the towed vehicle after the brakes have been applied to the towing vehicle. However, it is preferable to begin application of the towed vehicle brakes prior to application of the towing vehicle brakes so that the towed vehicle will begin slowing down prior to, and no later than, the time the towing vehicle begins to slow down. This issue was solved by the controller described in my U.S. Pat. No. 6,050,649, which is incorporated herein by reference. The controller of that patent has worked well. However, it can be improved.

BRIEF SUMMARY

The disclosed brake controller overcomes the flaws of current brake controllers for towed vehicles. The brake controller comprises a sensor assembly, which in one embodiment, includes two sensors: a first sensor which is operatively connected to the brake pedal arm to measure the brake pedal's position, and a second sensor which is positionally fixed in the towing vehicle, such as by being mounted to any fixed surface of the vehicle, such as under the dash, the fire wall, or in the controller housing. Using the two sensors, the controller monitors the relative orientations of the pedal sensor and the vehicle frame sensor. When the brake pedal is pressed, it changes its orientation with respect to the vehicle, which is measured by the pedal position sensor. The change in position of the brake pedal is measured, and then adjusted by the controller based on the output of the second sensor. The controller then sends a control signal to the towed vehicle brakes to activate the brakes of the towed vehicle. In particular, the signal of the second sensor is effectively subtracted from the signal of the pedal position sensor to eliminate "noise" which might affect the output of the pedal position sensor, such that the adjusted signal more accurately reflects the position of the brake pedal.

In an alternative embodiment, the sensor assembly comprises a sensor which is not affected by inertia. Such a sensor can, for example, be a laser measuring sensor, which will measure a distance from the brake pedal to a fixed point in the vehicle. This single sensor would then monitor the relative orientation or position of the pedal sensor relative to the fixed point on the vehicle.

BRIEF DESCRIPTION OF THE DRAWINGS

Corresponding reference numerals will be used throughout the several figures of the drawings.

DETAILED DESCRIPTION

Figure 1:
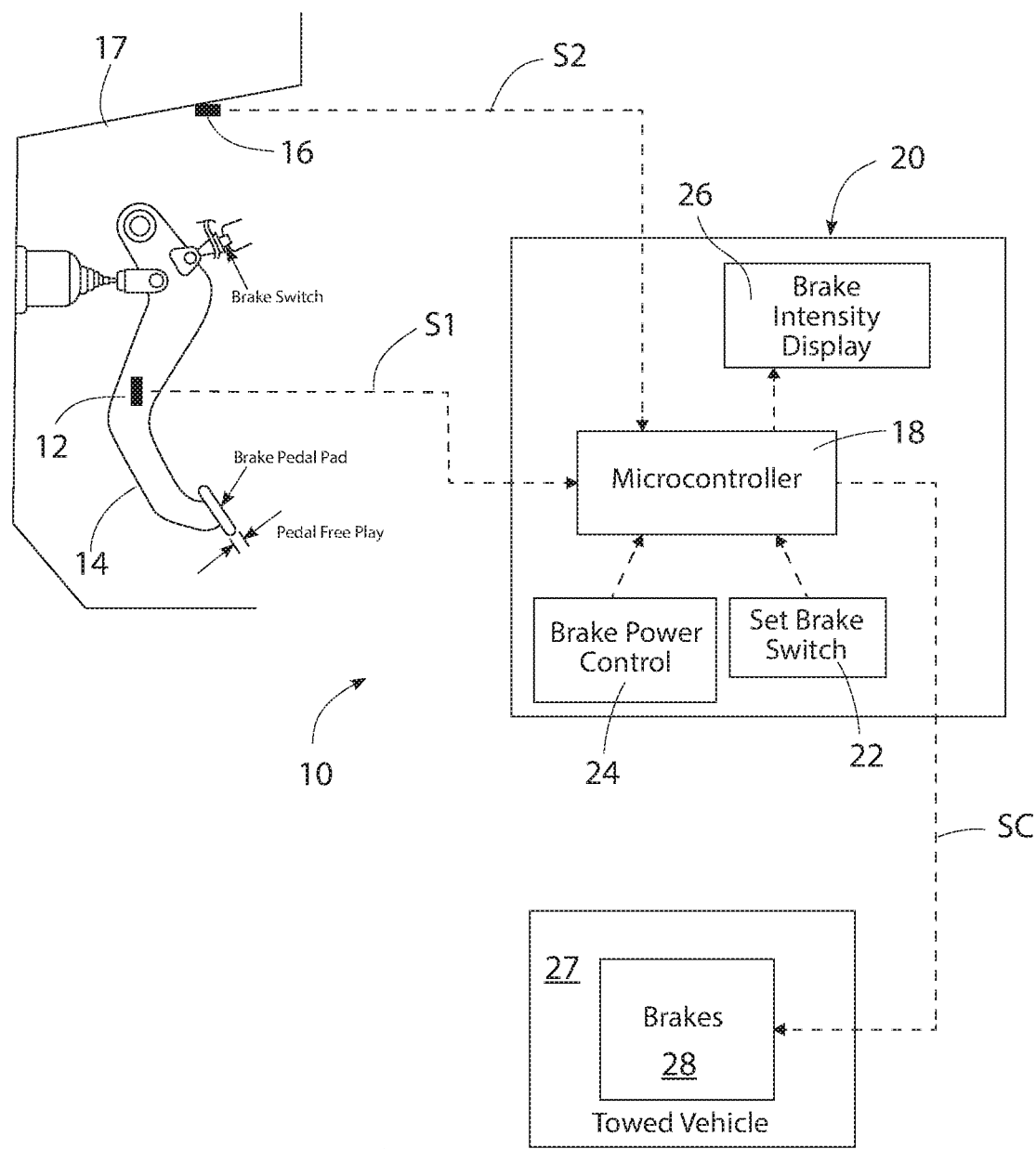
FIG. 1 is a schematic of a brake controller.

The following detailed description illustrates the claimed invention by way of example and not by way of limitation.

This description will clearly enable one skilled in the art to make and use the claimed invention, and describes several embodiments, adaptations, variations, alternatives and uses of the claimed invention, including what I presently believe is the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

Turning to FIG. 1 of the drawings, a brake controller 10 includes a sensor assembly. The sensor assembly includes an electronic pedal position sensor 12 and a second, fixed sensor 16. The electronic pedal sensor 12 measures the position of the brake pedal and outputs a signal indicative of the position of the brake pedal of the towing vehicle. The brake pedal position sensor 12, can, for example, be operatively connected to a brake pedal arm 14 in any suitable manner. The second electronic sensor 16 is secured to a fixed surface 17 of the towing vehicle, such as the dashboard or firewall. The second sensor 16 outputs a signal indicative of motion of the towing vehicle. The outputs from the pedal position sensor 12 and second sensor 16 are both received by a microcontroller or processing unit 18. The microcontroller 18 can be contained in a housing 20, which, for example, is mounted to the dashboard of the towing vehicle. The controller housing 20 includes a "set brake" switch 22, a "brake power control" switch 24, and a brake intensity display 26. The second sensor 16 can be contained in the controller housing 20, rather than being mounted, for example, to the towing vehicle's dashboard or firewall. The "brake power control" switch 24 can be a gain controller, which, as discussed below, can be used to adjust the control signal, and hence the voltage, sent to the towed vehicle brakes.

The microcontroller 18 receives the signals from the two sensors, and based on the output of the two sensors, generates a signal, such as a control output voltage, which is delivered to the towed vehicle 27 to apply the towed vehicle brakes 28. The sensors 12 and 16 are preferably identical to each other. Although they can be any type of electronic position sensor, the sensors 12 and 16 preferably are inertial sensors. As such, they output signals based on changes in their respective motion. The brake pedal position sensor 12 will thus generate a signal when the brake pedal is depressed that is indicative of the degree to which the brake pedal has been depressed. Because the pedal position sensor 12 is an inertial sensor, changes in motion of the towing vehicle (such as deceleration) will affect the output of the brake pedal position sensor 12. Thus, the signal (S1) from brake pedal position sensor may not accurately reflect the position of the brake pedal, and thus the degree to which the brake pedal has been depressed.

The second sensor 16, on the other hand, senses changes in motion of the towing vehicle—for example, whether the towing vehicle is accelerating or decelerating, whether the road is bumpy or smooth, etc. The second sensor 16 thus outputs a signal (S2) of the "noise" which is otherwise in the signal (S1) from the brake pedal position sensor 12. The microcontroller 18 therefore subtracts the output (S2) of the second sensor 16 from the output (S1) of the pedal position sensor 12 to generate an adjusted output or control signal (SC). By subtracting the "noise" measured by the second sensor 16 from the output of the pedal position sensor 12 to produce the control signal, the control signal will better or more accurately represent the degree to which the brake pedal has been depressed and thus the degree to which the towing vehicle brakes have been applied.

The brake pedal position sensor 12 and the second sensor 16 are in communication with the microcontroller 18 such that the microcontroller will receive their signals. The connection between the sensors and the microcontroller can be wireless (i.e., via Bluetooth or any other wireless connection) or wired. The microcontroller 18 is electrically connected to the brake system 28 of a towed vehicle 27 by means of, for example, a FET switch 30. (FIG. 4) The microcontroller is preprogrammed to increase electrical power or actuation of the trailer brakes responsive to the extent to which the brake pedal is depressed, as adjusted by the output of the second sensor. It will be appreciated by those skilled in the art that the braking power applied to the trailer brakes thus is varied based upon the brake pedal position of the towing vehicle.

Additionally, the output from the pedal position sensor (and hence, the control signal generated by the microcontroller) can be attenuated or increased by means of the brake power control switch 24 on the controller housing. As noted above, the switch 24 can comprise a gain controller. Using the brake power control switch, the driver of the towing vehicle can proportionally increase or decrease the control signal sent to the brakes of the towed vehicle.

Figure 2:
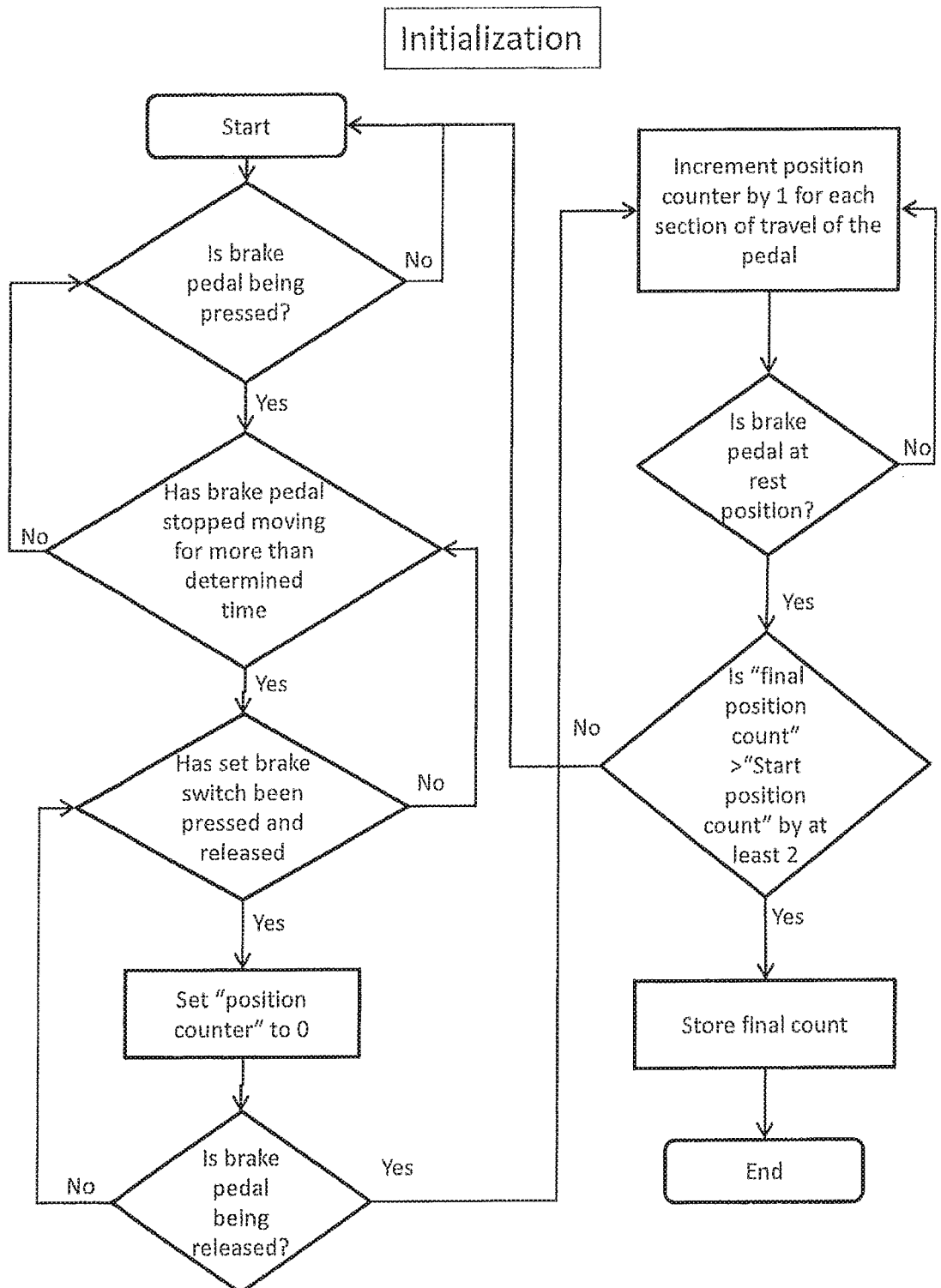
FIG. 2 is a flow chart showing the initialization procedure for the controller.

After installation of the brake controller 10 in a towing vehicle, the brake controller must be initialized, preferably to a brake pedal position representing a full stop. As shown in FIG. 2, initialization is performed by the operator depressing the towing vehicle brake pedal to a set position, which preferably is a full stop position for the towing vehicle brakes, and holding the brake pedal at the set position for a few seconds. The operator then presses and releases the "Set Brake" switch 22 located on the controller housing. When the "Set Brake" switch is pressed and released, the controller sets a position counter to 0. As the operator releases the brake pedal, the controller monitors the output from the pedal position sensor 12 and measures the distance from the set position to the at-rest position (when the operator is no longer pressing on the brake pedal). The travel of the brake pedal from the brake set position is "counted off" in sections of a determined size. For example, each section of travel can represent about 1/16" or about 2½°-3° of travel. As the brake pedal moves from the set position to its at-rest position, the microcontroller increments the positon counter by one for each "section" of travel. Thus, if the total distance traveled is 3" and the travel section is 1/16", then the value of the position counter would be 48 when the brake pedal is in its at-rest position. The final position counter number is then stored in a memory in the controller as long as the final counter number is greater than a predetermined number, as described below. The controller 20 can include a timer, and based on the signal received from the pedal position sensor, the controller can determine when the pedal is at its set position or in the at-rest position by determining that the brake pedal has not moved for a determined period of time (such as a few seconds).

The microcontroller is preprogramed with a "start count" number which is representative of a predetermined start position of the brake pedal at which the controller will begin to send a control signal to the towed vehicle brakes. When the brake pedal is at the start position, the distance the brake pedal has to travel to reach set position of the towing vehicle brakes is typically about three-quarters of an inch (¾"). As can be appreciated, this start position can be selected to be more than or less than ¾". As just noted, and as discussed further below, a control signal is not sent to the towed vehicle brakes until the brake pedal has been depressed to the start position. For the system to accept and store the final position counter number, the final position counter number must be greater than the start positon counter number. Preferably, the final position counter number is at greater than the start position counter number by at least 2. If each "count" represents about 1/16", then the final positon preferably is more than 2/16" above the start position. Thus, for example, if the start counter number is 11, then the final counter number would be at least 13 for the system to accept and store the final counter number. If the final counter number does not exceed the start counter number by the desired amount, then the initialization process will fail and will need to be restarted. As can be appreciated, other techniques or methodology can be used to determine when the brake pedal is at the set position and at-rest position, and to determine the start position of the brake pedal.

Figure 3:
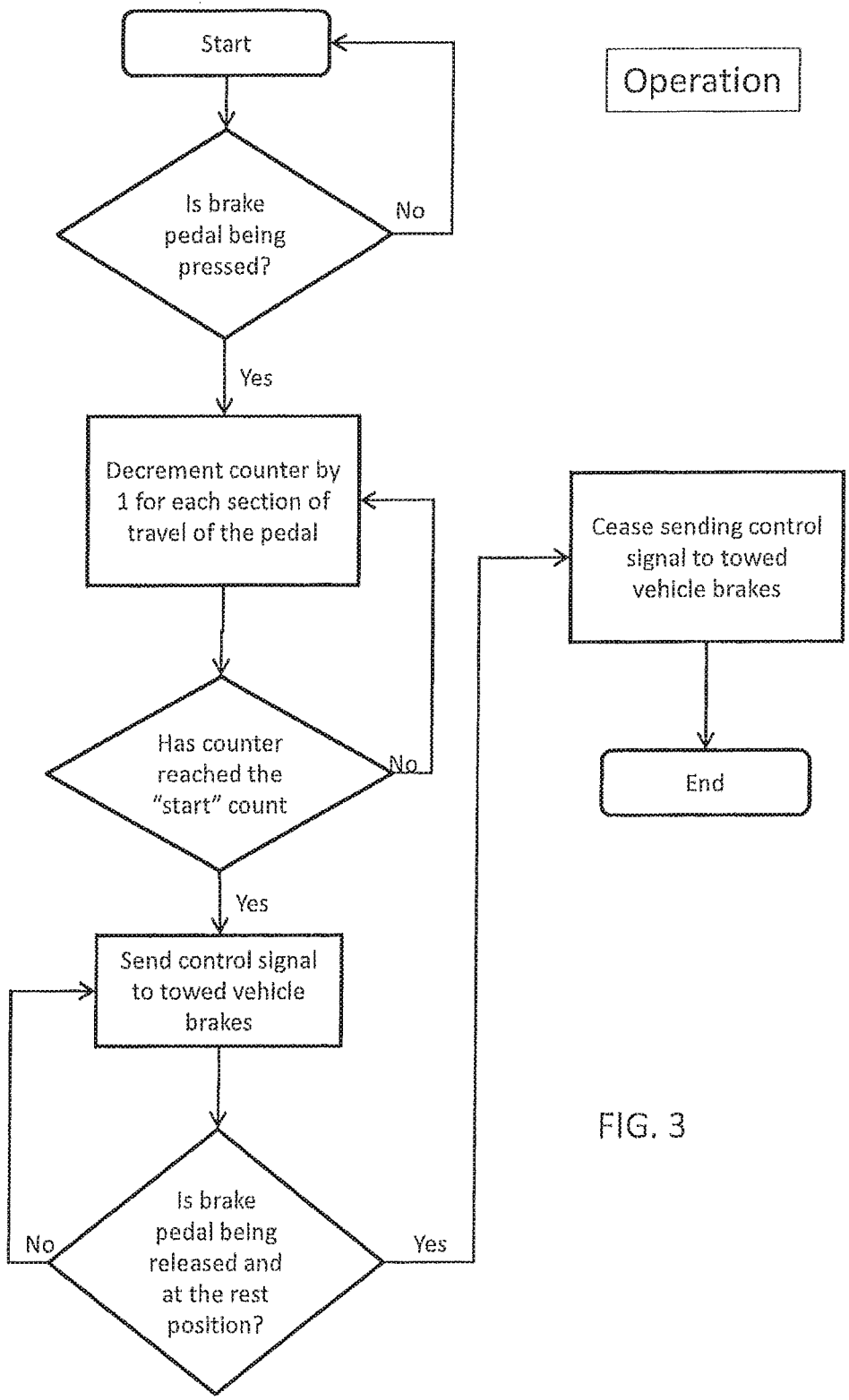
FIG. 3 is a flow chart showing operation of the controller during normal use.

In use (i.e., during normal braking), as shown in the flow chart of FIG. 3, when the brake pedal is depressed, the microcontroller decrements the position counter by 1 for each "section" of travel the brake pedal moves. When the position counter reaches the start position counter number (i.e., when the brake pedal is pressed to the start position), the controller will begin sending a control signal to the towed vehicle brakes to apply the towed vehicle brakes. The control signal (and thus the control voltage) transmitted to the towed vehicle brakes increases from the start position counter number until the position counter is decremented to 0, at which point the voltage that will be transmitted to the towed vehicle brakes has reached a maximum. If the brake pedal is pressed beyond the set position (which can occur in a rapid or sudden stop or if the system is initialized with the brake pedal only partially depressed), the position counter will become negative. However, because the control signal sent to the towed vehicle brakes reaches a maximum when the position counter is decremented to 0 (i.e., at the set position), further pressing of the brake pedal will not result in further increasing the control signal sent to the towed vehicle brakes. As can be appreciated, this system delays transmission of the control signal to the towed vehicle's brakes until the brake pedal is pressed to its start position. This helps ensure that the towed vehicle's brakes are not applied too early, but yet are still activated not later than the time the towing vehicle brakes are activated (and preferably slightly before the towing vehicle brakes are activated).

It will be noted by one skilled in the art that during initialization, the operator need not fully depress the towing vehicle brake pedal before pressing the "set brake" button to initialize the system. If the system is initialized to a less-than maximum brake pedal depression, the responsiveness of the towed vehicle brakes to the brake pedal position of the tow vehicle will be increased. That is, pressing the set brake switch at less than full application of the brake pedal will cause the towed vehicle brakes to be activated sooner than if the set brake switch is pressed when the brake pedal is fully pressed.

As can be appreciated, inadvertent initialization of the controller can affect when the towed vehicle brakes are applied. Inadvertent activation can be avoided in several ways. The towing vehicle should be at rest (i.e., not moving) when the control system is initialized. Thus, the system can be programed to not accept an initialization signal (i.e., to ignore the pressing of the set brake switch) if the signal (S2) from the second sensor 16 does not indicate that the motion of the vehicle is changing. Alternatively, the signal from the set brake switch can be ignored if the brake pedal has not been maintained in a pressed position for more than a predetermined period of time (such as a few seconds). As another alternative, an initialization switch can be provided which would have to be pressed prior to pressing the set brake switch, such that initialization of the controller would require pressing of two buttons or switches.

Figure 4:
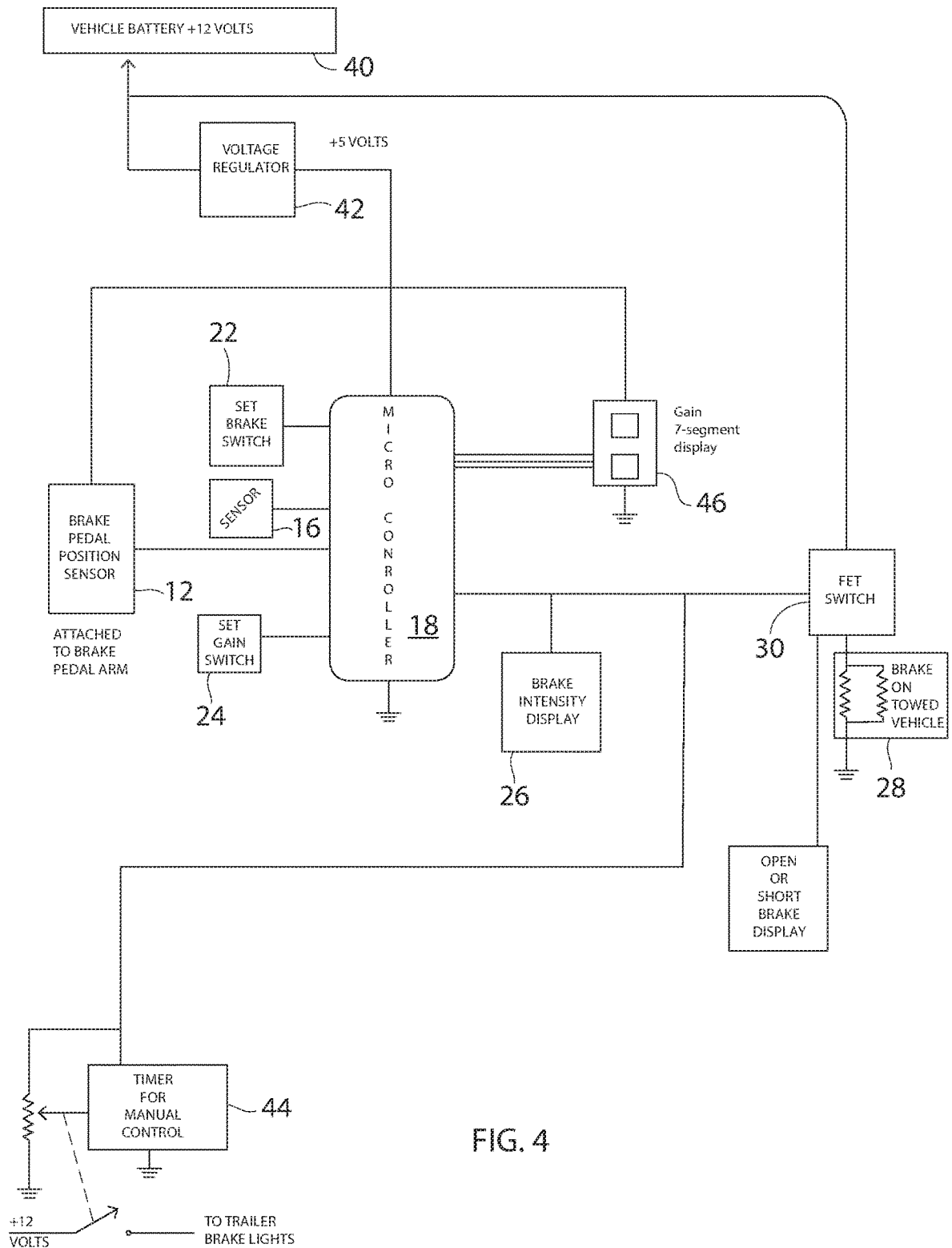
FIG. 4 is a schematic showing connection of the controller to the towing vehicle's electrical system.

Turning to FIG. 4, the various system components comprising the brake controller 10 are shown. Electrical power is supplied to both the brake controller 10 and to the towed vehicle brake system 28 by the towing vehicle battery 40, typically rated at +12 volts. The voltage supplied to the brake control system from the vehicle battery is regulated to +5 volts by a voltage regulator 42.

The microcontroller 18 receives power from the voltage regulator 42 and input signals from the Set Brake switch 22, the brake power control switch 24, the pedal position sensor 12 and the second sensor 16. The microcontroller includes an internal timer which can be programmed to run for a length of time determined by a value loaded into one or more internal timing registers. The values stored in the timing registers correspond to the particular combination of towing vehicle brake pedal position and gain setting.

Output from the microcontroller is directed towards control of the brake intensity display 26 and the gain display 46. The brake intensity display 26 provides the operator with a visual indication of the towed vehicle braking percentage being applied by the brake controller 10 at any given moment. Similarly, the gain display 46 provides a continuous visual indication of the currently selected brake power control setting. Additionally output from the microcontroller 18 is directed towards control of the output device 30, for example, a TOPFET high side switch which will transmit the control signal to the towing vehicle.

During normal towing vehicle braking, the microcontroller 18 sends a cyclic output signal of +5 volts to the output device 30 at a rate dependent upon the value stored in the internal timing registers of the microcontroller. When the output signal from the microcontroller drives the input of the output device high (+5 volts), the output device activates, and allows current at +12 volts to flow through the towed vehicle brakes 28. When the microcontroller output signal drops to +0 volts, the output device switches off, preventing current flow through the brakes. By controlling on-off ratio of the output signal, and correspondingly the current flow to the towed vehicle brakes, the microcontroller 18 can control the towed vehicle brake application.

As noted above, the double sensor system of the controller 10 eliminates "noise" in the signal for the pedal position sensor caused by changes in motion of the towing vehicle, such that the controller can accurately determine the position of the brake pedal. The two sensors of the controller 10 (which are inertial sensors) can be replaced with a single electronic sensor which is not affected by inertia. For example, the two inertial sensors 12 and 16 could be replaced with a single electronic measuring device (such as a laser measuring device) which will measure, for example, the distance between the brake pedal (or a set point on the brake pedal arm) and the towing vehicle's fire wall. As can be appreciated, the laser measuring sensor is not affected by inertia.

In the sensor assembly described above, the electronic pedal position sensor is affected by inertia, which is compensated for by the second, fixed sensor 16. As an alternative, the two sensors of the sensor assembly could be replaced with a single sensor which is not affected by inertia. Such a sensor could, for example be a laser measuring sensor, which measures a distance from the brake pedal to a fixed point (such as the firewall) of the towing vehicle. In this embodiment, because the sensor emits a signal indicative of the distance between the brake pedal and a fixed point of the vehicle, the sensor signal is not affected by inertia. Thus, the signal sent from the sensor assembly to the controller will not need to be corrected.

As various changes could be made in the above constructions without departing from the scope of the invention, it is intended that all matter contained in the above description or shown in the accompanying drawings shall be interpreted as illustrative and not in a limiting sense. For example, the signal from the microcontroller to the towed vehicle brake system can be transmitted wirelessly. This example is merely illustrative.

The invention claimed is:

1. A controller for controlling brakes of a towed vehicle, the controller comprising:
   a sensor assembly comprising:
      a first sensor mounted to a brake pedal or brake pedal arm of a towing vehicle, which outputs a signal (S1) indicative of a degree to which the brake pedal has been depressed; and
      a second sensor operatively mounted to a fixed, non-moving surface in the towing vehicle, said second sensor being an inertial sensor and outputting a signal (S2) indicative of changes in motion of the towing vehicle; and
   a processor which receives the signals of said first and second sensors and issues a control signal (SC) indicative of a voltage to be transmitted to said brakes of the towed vehicle; said processor adjusting the first sensor signal (S1) based on the second sensor signal (S2) to determine the control signal (SC).

2. The controller of claim 1, wherein said processor arrives at the control signal (SC) by subtracting the second sensor signal (S2) from the first sensor signal (S1) such that SC=S1−S2.

3. The controller of claim 1, wherein said first and second sensors are the same type of sensor.

4. The controller of claim 1, wherein said control signal represents the degree that the brake pedal is depressed with motion noise of the towing vehicle removed.

* * * * *